H. A. HOLDERMAN.
FRUIT MILL AND PRESS.
No. 74,361. Patented Feb. 11, 1868.
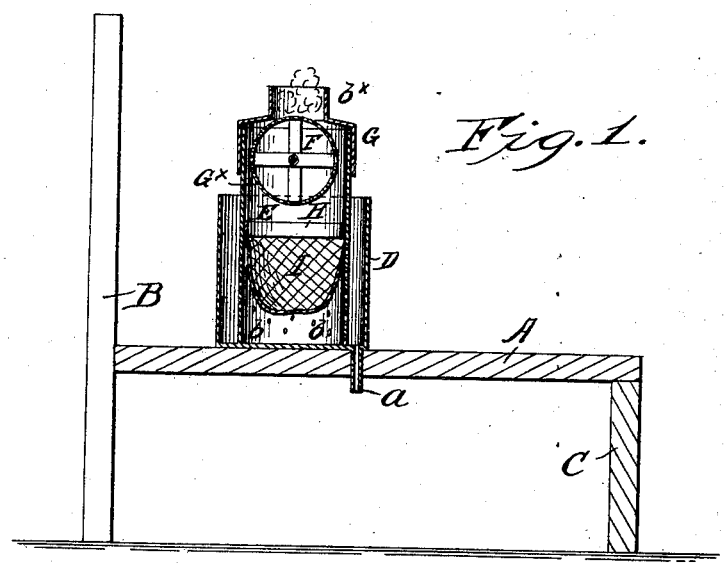
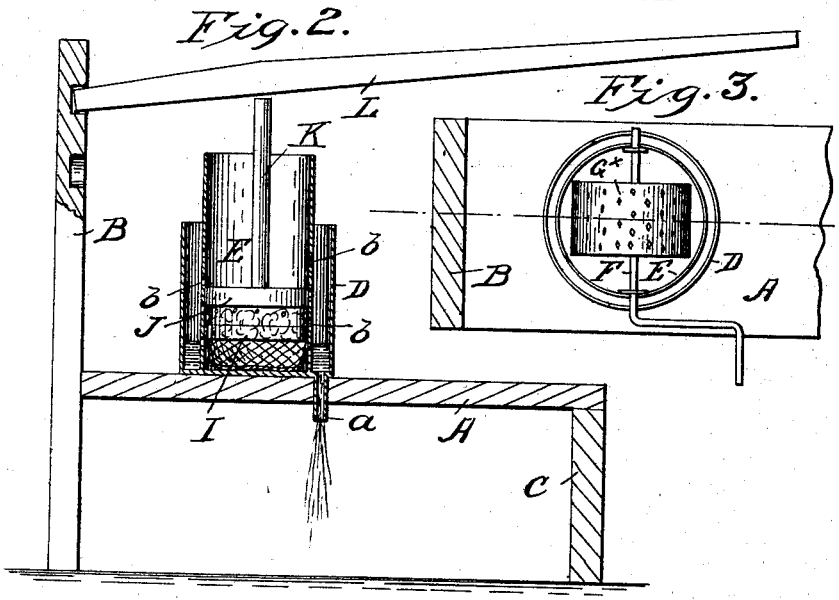
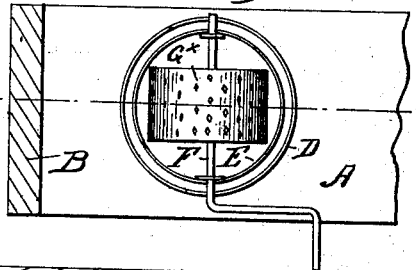

United States Patent Office.

HENRY ABRAHAM HOLDERMAN, OF NORTH MANCHESTER, INDIANA.

Letters Patent No. 74,361, dated February 11, 1868.

IMPROVED FRUIT-MILL AND PRESS.

*The Schedule referred to in these Letters Patent and making part of the same.*

---

TO ALL WHOM IT MAY CONCERN:

Be it known that I, HENRY A. HOLDERMAN, of North Manchester, in the county of Wabash, and State of Indiana, have invented a new and improved Combined Fruit-Mill and Press; and I do hereby declare that the following is a full, clear, and exact description thereof, which will enable others skilled in the art to make and use the same, reference being had to the accompanying drawings, forming a part of this specification.

This invention relates to an improved combination of a fruit-mill and press, designed for family use, and for the manufacture of cider, wine, &c., &c.

The object of the invention is to obtain a simple, economical, and efficient device, for the purpose which, so far as expense and the convenience of operation are concerned, will be within the reach of all persons of the community requiring such an article. In the accompanying sheet of drawings—

Figure 1 is a vertical central section of my invention, shown adapted as a mill.

Figure 2, a vertical central section of the same, adapted to a press.

Figure 3, a plan or top view of the grinding-apparatus pertaining to the same.

Similar letters of reference indicate corresponding parts.

A represents a platform, supported at a suitable height by uprights B C, one of which, B, extends considerably above the platform, as shown in figs. 1 and 2. D is a cylinder, secured to the platform A in any suitable way which will admit of the cylinder being readily applied to and detached from the bench. The cylinder D may be constructed of sheet metal or wood, and is provided, at its bottom, with a discharge-tube, $a$. Within the cylinder D there is placed, concentrically, a cylinder, E, considerably smaller in diameter than D, but extending some distance above it. This inner cylinder E is perforated with holes $b$, the perforations being in the portion of E which is within D, and forming a communication between D and E, as shown in figs. 1 and 2. When the device is used as a mill, a shaft, F, is fitted in notches in the upper end of the cylinder E, and on this shaft there is secured a hollow sheet-metal cylinder, $G^\times$, open at both ends, and having its periphery punched to form a grating-surface and admit of the juice of the fruit passing through it. This cylinder $G^\times$ works in the upper end of the cylinder E, and on the latter is fitted a cap, G, having a neck, $b^\times$, at its top, and open at its upper end. H is an elastic metal or wooden band, having a cloth strainer, I, fitted within it. This band and strainer is fitted within the cylinder E, and the fruit to be grated is put into the neck $b^\times$ of cap G, and grated or reduced by the revolutions of the cylinder E, the juice and grated fruit passing down into the strainer I, which is in the form of a bag. When this bag or strainer is nearly filled with grated fruit, the cap G is removed from the top of the cylinder E, the grating-cylinder $G^\times$ removed, the band H taken out of the bag, and the top of the latter folded or closed over the grated fruit. A plunger, J, is then fitted in cylinder E, said plunger having an upright rod, H, attached, on which a lever, L, is made to bear, one end of the lever being fitted in a hole in the upper part of the upright, B. This lever is operated by hand, and several holes are made in the upright, B, in order that the lever may be adjusted higher or lower, as occasion may require, in order to facilitate the forcing down of the plunger J, to express the juice from the grated fruit. The juice passes through the strainer I, and perforations $b$ in cylinder E, into cylinder D, and is discharged from D through the tube $a$.

This device is extremely simple and efficient, may be operated with the greatest facility, and with but a moderate expenditure of power.

Having thus described my invention, what I claim as new, and desire to secure by Letters Patent, is—

The two cylinders, D E, fitted one within the other, and the inner cylinder E, perforated, as shown, in connection with the cap G, grating-cylinder $G^\times$, and the strainer I, all arranged to operate in the manner substantially as and for the purpose set forth.

The above specification of my invention signed by me, this thirtieth day of September, 1867.

HENRY ABRAHAM HOLDERMAN.

Witnesses:
JOHN R. WALLACE,
FRANCIS M. EAGLE,
CARY E. COWGILL.